(12) United States Patent
Reverso

(10) Patent No.: US 6,224,915 B1
(45) Date of Patent: May 1, 2001

(54) PRODUCTION OF BIOPROTEINS FOR ZOOTECHNICAL USE FROM WHEY AND WASTE OF DAIRY INDUSTRIES

(76) Inventor: Riccardo Reverso, Via Mazzoni, 4, 15100 Alessandria (IT)

( * ) Notice: Subject to any disclaimer, the term of this patent is extended or adjusted under 35 U.S.C. 154(b) by 0 days.

(21) Appl. No.: 09/257,477

(22) Filed: Feb. 25, 1999

(30) Foreign Application Priority Data

Feb. 26, 1998 (IT) .............................................. MI98A0389

(51) Int. Cl.⁷ .................................................... A23C 21/02
(52) U.S. Cl. ...................... 426/42; 435/254.1; 435/255.4; 435/105; 435/171
(58) Field of Search .................................. 426/41, 42, 43, 426/53, 583, 491; 435/105, 171, 162, 163, 255.1, 254.1, 255.4

(56) References Cited

U.S. PATENT DOCUMENTS

| | | | |
|---|---|---|---|
| 4,165,389 | * 8/1979 | du Chaffant et al. ................ | 426/42 |
| 4,544,637 | * 10/1985 | Keggins et al. ..................... | 435/253 |
| 4,895,801 | * 1/1990 | Kan et al. ............................ | 435/101 |
| 5,707,524 | * 1/1998 | Potter .................................. | 210/606 |

* cited by examiner

Primary Examiner—Keith Hendricks
(74) Attorney, Agent, or Firm—Guido Modiano; Albert Josif; Daniel O'Byrne

(57) ABSTRACT

The aim of the present invention is to obtain bioproteins derived from whey and/or wheyey residues and waste of the dairy industry. The obtainment of these bioproteins therefore entails the treatment of the whey and/or wheyey residues and includes a method for eliminating the lactose contained in milk in order to subsequently be able to extrapolate the proteins therefrom so that they constitute a product which is reusable and, in particular, generally digestible. In order to provide the treatment according to the invention, there are also particular plant stages for performing this elimination at the cellular level. It is particularly important for the invention that specific microorganisms are used which perform the elimination at the cellular level of the lactose contained in whey and/or wheyey residues.

15 Claims, 4 Drawing Sheets

DIAGRAM 1

(a)

(b)       +
     2 CO$_2$

DIAGRAM 3

PRODUCTION OF BIOPROTEINS FOR ZOOTECHNICAL USE FROM WHEY AND WASTE OF DAIRY INDUSTRIES

BACKGROUND OF THE INVENTION

The present invention relates to a method for eliminating the lactose contained in whey and/or wheyey residues and waste in order to then extrapolate proteins therefrom so that said proteins constitute a product which is reusable and in particular generally digestible. Another aspect of the invention relates to the plant stages for performing this elimination at the cellular level. Another aspect of the present invention relates to the processing of whey and/or wheyey residues, comprising lactose elimination to be able to recover the proteins of interest. Finally, another aspect of the invention is the use of particular microorganisms which perform the elimination, at the cellular level, of the lactose contained in whey and/or wheyey residues.

The need to produce proteins to be added to fodder used in intensive livestock rearing is a serious problem, since obtaining noble proteins is becoming increasingly onerous. In recent times there has been a decrease in the availability of fishmeal and meatmeal flours owing to limited exports from foreign countries.

Furthermore, the conditioning of dairy industry waste per se is a cost which affects the community without often providing the expected environmental result, since the proposals for disposal do not always fully solve the problem.

It is therefore clear that the extrapolation of proteins is an environmental problem as well as an economical one and that the possibility to obtain these proteins from the wastewater of agri-foodstuff industries, from slaughterhouse waste, from plant wastewater and from other sources in general is highly important.

Currently, the technologies related to the whey disposal process can be classified as follows:

I. Demineralization with Ion-exchange Resins

This operation is performed with the aid of ion-exchange resins. For a correct metabolization process, as stated in a well-known report from the Animal Disease Prevention Institute of Teramo, treatment must be performed on 50% of the available whey. The removal of these salts allows to recover products meant for agriculture.

II. Recovery of Milk Proteins

Milk proteins are very important in the preparation of baby biscuits, dietary foodstuffs and foodstuffs in is general, but the high cost of the plants and of their management makes the recovery technology, with reverse-osmosis and ultrafiltration processes, feasible only in large dairies or dairy consortia.

III. Recovery of Lactose for Food and Pharmaceutical Use

Lactose is used in many fields, such as the pharmaceutical, cosmetic and agri-foodstuff industry, but its consumption on a national level is rather low and plant costs are rather high.

IV. Drying to Obtain a Powder to be Used in the Fodder Industry

The use of dried whey has no industrial application of interest; new EEC standards have indeed penalized it for two essential reasons: lactic acidity and the presence of lactose.

The lactic acidity of lactose allows to use the product only in a narrow range of foodstuffs and pharmaceutical products, although the use of demineralization has partly corrected this acidity.

However, the decisive factor that makes dried whey not adapted for fodder and for human use, at least in many cases, is the presence of lactose. In order to be metabolized, lactose must in fact be broken down by $\beta$-galactosidase, which however is present only in unweaned animals. This means that lactose cannot be digested by animals weighing more than 20–25 kg, which return it intact in their feces. Furthermore, in animals and humans lactose is the triggering factor in a very severe hereditary-type disease known as galactosemia. Clearly, potentially galactosemic humans and animals cannot include lactose-containing food in their diet.

In view of the above described problems, there is the need of eliminating the lactose contained in whey in order to then extrapolate the free proteins therefrom and market a product which is generally more digestible. It is even clearer that it is necessary and advantageous to perform this elimination of lactose before the product that contains it reaches biologically advanced organisms, i.e., to perform it at the cellular level, with all the selective possibilities entailed by this approach.

The normal metabolization of lactose, which is the main sugar contained in whey and/or wheyey residues, is feasible because the above mentioned microorganisms have $\beta$-galactosidase activity, which as mentioned breaks down lactose into glucose and galactose.

The strains, however, are inhibited in their growth by the ethyl alcohol produced by the enzyme that catalyzes the first step of biosynthetic pathways (in our case, $\beta$-galactosidase). This inhibition, known as "feedback inhibition", is such that when the ethanol levels tend to drop, the $\beta$-galactosidase becomes active again.

It is thus evident that it is important to remove the ethanol catabolite in order to obtain a continuous process; one possible route is the symbiosis of two strains of microorganisms, the first one being glucose+galactose+ and the second one being ethanol+. However, this route is not feasible in the context of proteins, since the ethanol+ microorganism is not in the class of "safe" strains. Microorganism strains intended for lactose metabolization must in fact be those classified as "safe" and proposed and accepted by the EEC and CNR commissions covering this issue. However, it is noted that this symbiosis, which is widely studied in the laboratory, remains highly interesting in fields in which the biomass is meant for agricultural products.

The mechanism for lactose metabolization generally follows three routes:

1. The lactose is broken down by an extracellular enzyme ($\beta$-galactosidase) into glucose and galactose by a glucose+ and galactose+ microorganism in order to act on its endocellular metabolism (as explained above);
2. The lactose is brought into the cell by means of a carrier protein activated by the enzyme permease; the endocellular hydrolytic breakdown releases glucose and lactose, which enter the tricarboxylic acid cycle by means of the Embden-Meyerhoff route;
3. A hydrolytic breakdown of the lactose is performed by enzymes by means of trapped cells and the resulting saccharides are metabolized with at least one pair of hyphomycetes in which one is glucose+galactose− and the other is glucose−galactose+.

SUMMARY OF THE INVENTION

The aim of the present invention is achieved by means of a combination of the second and third pathways described above. In order to obviate the above described drawbacks of the prior art, lactose breakdown is performed outside the natural metabolization process and two "safe" strains are used, one being a glucose+galactose− strain, the other one being a glucose−galactose+ strain.

The enzymatic breakdown of lactose produces galactose and glucose as output saccharides. This process has been chosen since yeasts, like homeofermenting microorganisms, despite having in their genome the memory for breaking down the disaccharide lactose, spend biochemical energy and accordingly have longer fermentation times. The microorganisms used in the process according to the invention belong to the strain Kluyveromyces marxianus var. marxianus, ATCC codes 8554 and 8601.

These microorganisms work in mutual symbiosis. They must also be seeded in combination with the strains ATCC 8661 and 8662, which are necessary for the absorption of lipids, which are generally present in whey and/or wheyey residues. Strains ATCC 8661 and 8662 can be omitted only if whey analysis shows it is free of lipids.

The basic reason for choosing the symbiosis of two microorganisms instead of using a single microorganism is the fact that glucose enters central metabolism directly, whereas galactose, after being phosphorylated, is converted into an intermediate compound of central metabolism (glucose-l-phosphate). The biochemical reactions for bringing galactose into central metabolism are allowed by energy bonds, and a glucose+galactose+ cell tends to deplete the glucose (as a source of carbon) before engaging the pyrophosphate cycle, which is a necessary step in the epimerization of galactose.

Another advantage that arises from the use of two strains, a galactose+glucose− one and a galactose−glucose+ one, is that one obtains carboxylation of the mitochondria to synthesize glucose from pyruvate, thus saving energy and achieving better biomass efficiency.

Further advantages arising from the present invention will become apparent from the description of the methods for providing said invention.

In one embodiment of the present invention, the whey and/or wheyey residues are treated to eliminate the unwanted lactose according to the above described process and with the symbiotic combination of the ATCC 8554 and 8601 microorganisms mentioned above.

In another embodiment of the present invention, there is a route for processing the whey and/or wheyey residues to eliminate unwanted substances, mainly lactose, so as to obtain free proteins which form a product which can be used in particular in the food industry. The processing route includes four main stages: pretreatment, demineralization, homogenization and enzymatic breakdown of the lactose. At the end of the four stages, the resulting biomass undergoes a further processing step, depending on the origin of the whey and/or wheyey residues and on the intended use of the resulting side products. In any case, as a consequence of this additional processing step a solid product is obtained which contains proteins derived from whey and/or wheyey residues, in which said proteins can be reused particularly in the food industry but also in other fields.

BRIEF DESCRIPTION OF THE DRAWINGS

The plant that provides the method according to the present invention, as shown in the FIG. 1, is conceived by excluding the concentration, ultrafiltration and reverse-osmosis regions that are widely used in Europe. Wash wastewater of the dairy is also excluded since it cannot be used to obtain bioproteins.

This embodiment is illustrated for the sake of clarity but nonlimitatively on the basis of the accompanying FIG. 1.

PRETREATMENT

Figure 1:
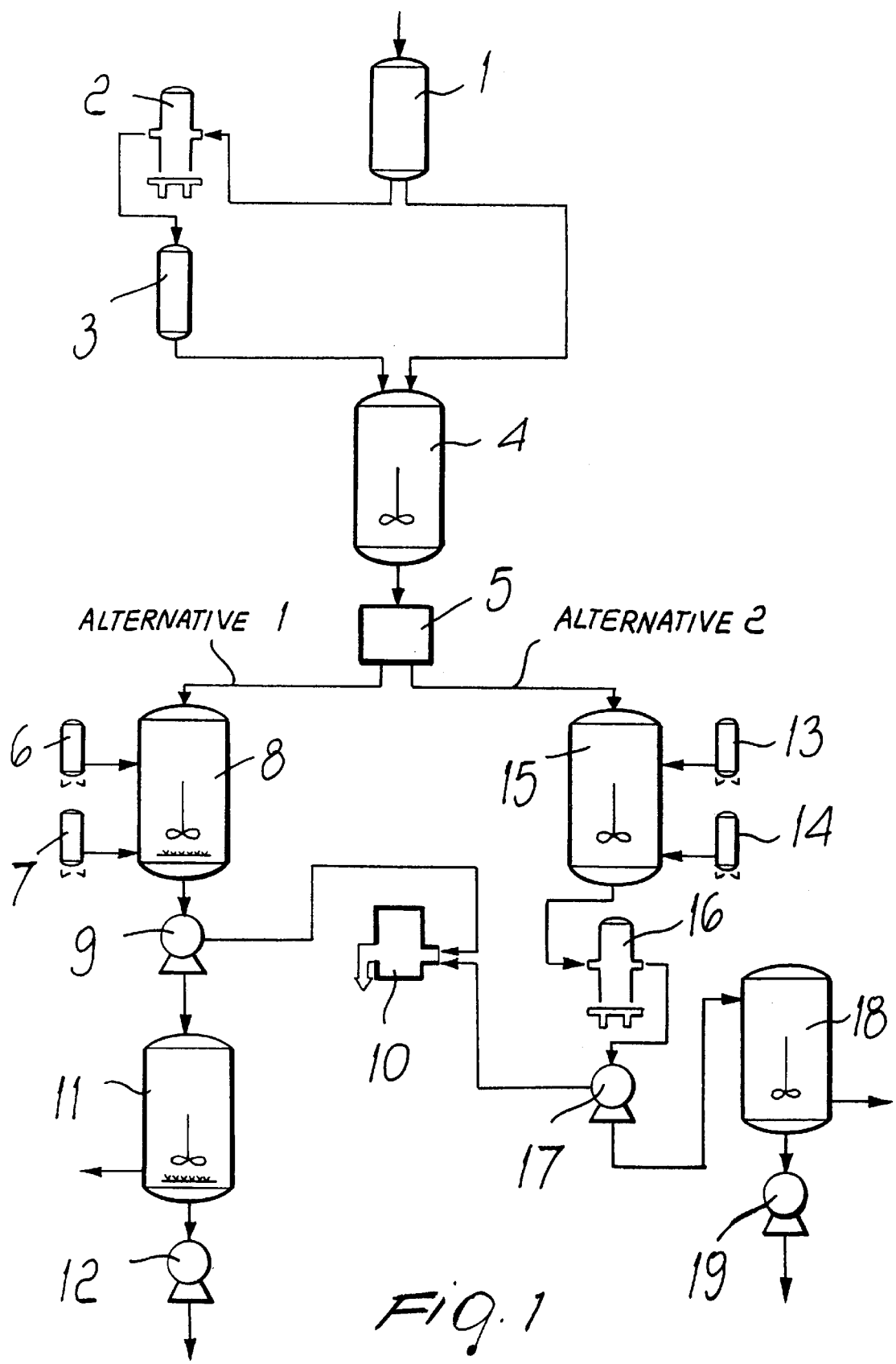

The whey and/or wheyey residues originating from collection are stored in a buffer reservoir 1 which has a capacity equal to approximately two days' work. Before being stored, the whey is pasteurized with a UHT process, whereas the wheyey residues require no pasteurization because they come from an acid treatment at 89–90° C. Product preservation is provided by means of palette coils (not shown).

An average analysis on various samples collected by the Animal Disease Prevention Institute of Teramo shows the composition presented in table 1. The listed whey composition relates to a series of average analyses of this product at the output of dairy processes and therefore relates to the waste product before each conditioning stage. This is an exemplifying analysis related to the dairy consortium of Teramo and the variations that may be observed in some values with respect to those listed here are recognizable by the man skilled in the art.

TABLE 1

| | |
|---|---|
| Lactose | 4.5% |
| Proteins N x6,25 | 0.8% |
| Non-proteinic nitrogen | 0.2% |
| Salts | 0.5% |
| Lipids | 0.05% |
| Lactic acid | 0.2% |
| pH | 5% |

This profile shows that the mineral salt content is slightly above the norm and this explains the partial demineralization. The C/N ratios are unbalanced toward nitrogen, while the pH is ideal for metabolization processes.

DEMINERALIZATION

Since the salt content is higher than the biological norm, it is necessary to perform a partial demineralization, which is carried out by means of resins 3 and is performed, as explained above, substantially on 50% of the whey and/or wheyey residues (the remaining part is sent directly to the homogenization stage without undergoing any intermediate treatment). The optimum operating temperature is reached by means of a heat exchanger 2 which is arranged in-line with respect to the supply pipe. Demineralization is performed in countercurrent on four columns, two of which operate while the other two are in regeneration, and there is an anion-cation system. The separated salts have different destinations and are in any case adapted for the preparation of humic fertilizers.

HOMOGENIZATION

Homogenization occurs in a stainless steel vessel 4 provided with an agitator, into which the nondemineralized product and the product that leaves the demineralization unit are blended in equal parts. The process is controlled by flow-rate measurement devices which are fitted in-line with respect to the supply pipes (not shown).

ENZYMATIC BREAKDOWN OF LACTOSE

Enzymatic breakdown is performed in a percolator 5 in which collagen, chitin, cells capable of breaking down lactose but no longer able to absorb breakdown products have been inserted on natural compounds. This step produces a lactose-free liquid which contains the breakdown sugars (glucose and galactose). As mentioned, the strain that produces the breakdown is Kluyveromyces marxianus var. marxianus, ATCC code 8554 and 8601. Advantageously, by activating the hydrolytic breakdown of the lactose before the metabolization process, biological energy is saved.

ALTERNATIVE ROUTE 1: OXIDATION

The liquid is equalized and balanced in its nutritional growth factors by means of metering micropumps, not shown, in order to obtain a balancing which precisely corresponds to element ratio C:N:P=10:5:1. Balancing occurs as follows:

balancing in nitrogen, in 6: performed with 0.3/0.4 g/l of ammonium sulfate or nitrate in equal concentration;

biological balancing in 7: performed with 1 cm³/l of Wolfe's Vitamin Solution

| Wolfe's Vitamin Solution | |
|---|---|
| Biotin | 2 mg |
| Folic Acid | 2 mg |
| Pyridoxine HCl | 10 mg |
| Thiamine HCl | 5 mg |
| Riboflavin | 5 mg |
| Nicotinic Acid | 5 mg |
| Calcium pantothenate | 5 mg |
| Cyanocobolamine | 100 mcg |
| p-aminobenzoic acid | 5 mg |
| Thioctic acid | 5 mg |
| Water | 1 lt |

The pH is maintained by means of a mixture of NaOH and KOH, 10 g/l each.

Metabolization is performed in a fermentation reactor 8 which is controlled by the control instruments for: pH, $O_2$, temperature, flowmeters, turbidimetry control, etcetera.

In the fermentation reactor 8, the biomass is seeded with the microorganism of the strain *Kluyveromyces marxianus* var. marxianus, ATCC code 36907. This microorganism is capable of producing β-galactosidase and of using lactic acid.

Following the treatment undergone in the fermentation reactor 8, the biomass is subjected to centrifugation in 9 in order to separate the solid fraction (which contains the mass of proteins) from the liquid fraction. The solid fraction is sent to the drier 10, which operates according to the "paddle-drier" process, and the proteins contained in the solid fraction are then packaged for sale. Since the microorganisms used are classified as safe, the proteins produced by the drying treatment in 10 can also be applied in the food industry.

Optionally, the supernatant resulting from centrifugation is instead transferred into the reactor 11, which is similar to the fermentation reactor 8 but has ⅓ of the volume of the fermentation reactor. Since the supernatant contains ethanol, it is seeded with an ethanol+ hyphomycete, the microorganism *Candida utilis*, ATCC code 26387, which uses ethyl alcohol as its only source of carbon. The biomass produced by the treatment of 11 is centrifuged in 12 and the result is an excellent product, on which it is possible to activate new metabolizations in the semi-solid fraction to produce humus. As an alternative, the same biomass, dried appropriately, can be used as an organic additive for greenhouses.

ALTERNATIVE ROUTE 2: HOMEOFERMENTATION

The anaerobic homeofermentation step is performed with different microorganisms, depending on the origin of the whey and/or wheyey residues and depending on the intended use of the resulting side products.

The liquid is equalized and balanced in its nutritional growth factors by means of metering micropumps, not shown, in order to obtain:

nitrogen balancing in 13: performed with 0.3/0.4 g/l of ammonium sulfate or nitrate in equal concentration;

biological balancing in 14: performed with 0.5 cm³/l of Aminoacid Solution and 0.5 cm³/l of Vitamin Solution;

pH correction: performed with 10 g/l of KOH and 10 g/l of NaOH in a single dose.

| Aminoacid Solution | |
|---|---|
| L-Histidine | 0.5 g |
| DL-Methionine | 0.1 g |
| DL-Tryptophan | 0.1 g |
| Water | 1000 ml |
| (filter before sterilizing) | |

| Vitamin Solution | |
|---|---|
| Biotin | 200 mcg |
| Calcium pantothenate | 40 mg |
| Folic acid | 200 mg |
| I-inositol | 200 mg |
| Niacin | 40 mg |
| p-aminobenzoic acid | 20 mg |
| Pyridoxine chloride | 40 mg |
| Riboflavine | 20 mg |
| Thiamine | 40 mg |
| Water | 1 lt |
| (filter before sterilizing) | |

The biomass is then seeded in 15 by a dense culture of homeofermenting bacteria whose metabolism releases its product into the medium. Of course, as mentioned earlier, depending on the microorganism used in each instance, the product of the metabolic process also varies. Fermentative conversion occurs only on the glucose and generates pyruvic acid; the most widely used pathway for this fermentative conversion is the Embden-Meyerhoff pathway. This route is used by many bacteria which have different end products, including lactic acid. The sequence of the reactions that convert glucose onto pyruvate is in fact very similar for all kinds of cell, whilst the destination of the pyruvate is different according to the situation.

Figure 2:
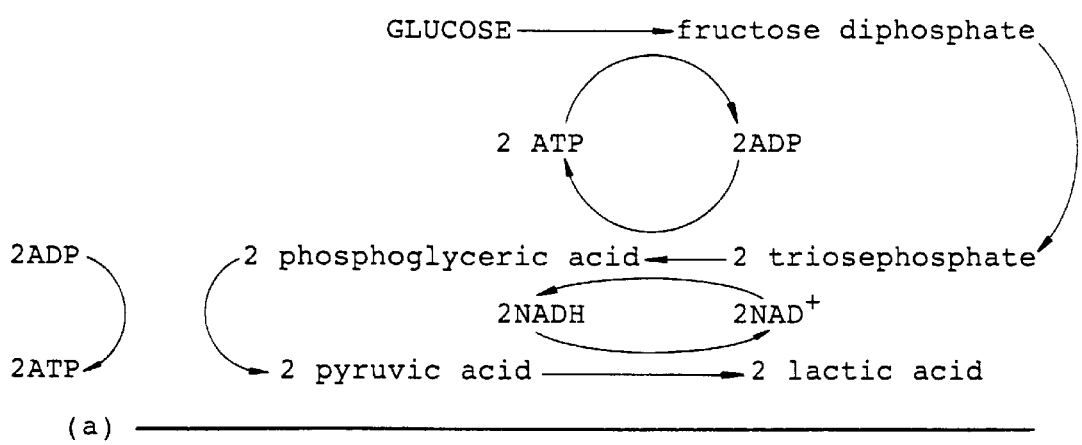
FIGS. 2, 3, 4 show biochemical pathways involving pyruvic acid.
Figure 2:
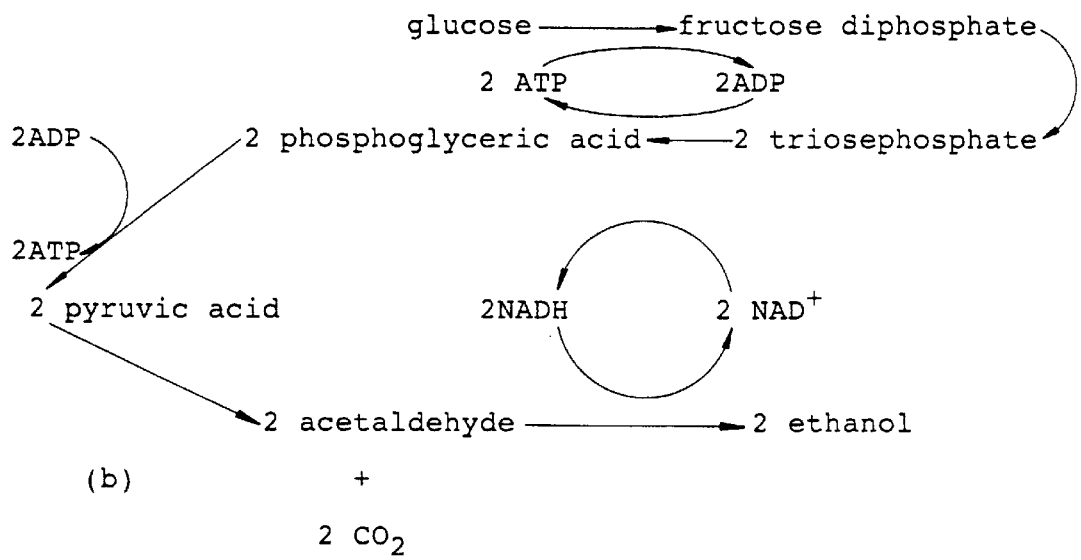

The stage of the transformation of glucose into pyruvic acid according to Embden-Meyerhoff can follow two routes, as shown in FIG. 2 diagram 1:

homolactic fermentation: typical of the fermentative metabolism of some lactic bacteria. During this fermentation, oxidation of NADH occurs as a direct consequence of the reduction of pyruvic acid to lactic acid.

alcoholic fermentation: typical of the anaerobic metabolism of glucose in yeasts. During this fermentation, pyruvic acid is first decarboxylated to acetaldehyde and then reoxidation of NADH occurs simultaneously with the reduction of acetaldehyde to ethanol.

Glucose fermentation: a) monolactic fermentation
b) alcoholic fermentation

Figure 3:
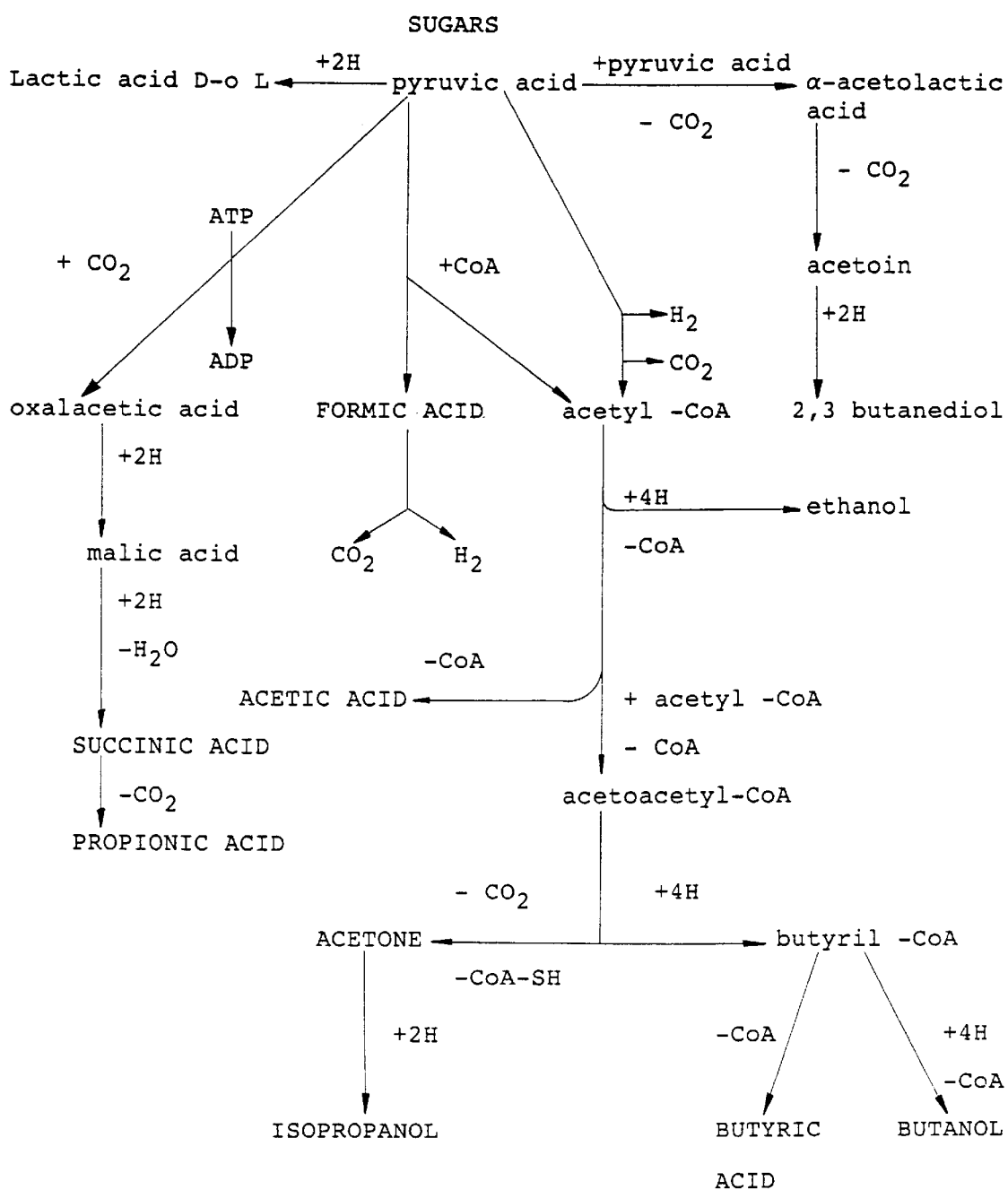

Pyruvic acid is therefore a key intermediate metabolite in the sugar conversion routes. The route of interest for the present invention is indeed the Embden-Meyerhoff route or glycolytic route. The possible routes for the fermentation of sugars starting from pyruvic acid can be shown schematically as in FIG. 3 diagram 2:

It is therefore evident that by carrying out the fermentations according to the biochemical steps provided for sugar fermentation, it is possible to obtain different catabolites of industrial interest. The identity of these catabolites depends on the microorganism used: the microorganisms that can be used according to the present invention are those listed in table 2:

TABLE 2

| | |
|---|---|
| 65 | Cod. ATCC 8041 |
| Lactobacillus Pentosus | gives Lactic acid in anaerobiosis |
| 66 | Cod. ATCC 15538 |
| Sporolacto-bacillus Inulinus | gives D-lactic acid in anaerobiosis |
| 67 | Cod. ATCC 26013 |
| Polyporus Palustris | gives formic and acetic acids |
| 68 | Cod. ATCC 14462 |
| Zygocaccharomyces Rouxii | gives formic and acetic acids |
| 69 | Cod. ATCC 8724 |
| Klebsiella Oxytoca | gives 2,3 - Butanediol |
| 70 | Cod. ATCC 12879 |
| Acetobacter Pasteurianus | gives acetic acid |
| 71 | Cod. ATCC 13668 |
| Saccharomyces Cerevisiae | gives cis-succinic acid |
| 72 | Cod. ATCC 39236 |
| Clostridium Acetobutylicum | gives acetone and butanol |
| 73 | Cod. ATCC 35295 |
| Clostridium Populeti | gives butyric acid and degrades cellulose in anaerobiosis |
| 74 | Cod. ATCC 824 |
| Clostridium Acetobutylicum | gives Butanol |
| 75 | Cod. ATCC 20017 |
| Saccharomyces sp | gives extra-cell hydroxybenzyl-alcohol |
| 78 | Cod. ATCC 21244 |
| Pseudomonas Putida biotype A | gives Levo + Beta idrossi-butirric acid |

The microorganisms involved cannot be used together, since antagonist activities would develop in the metabolism, thus decreasing the yield and quality of the final product. Only in the case of a mixed production of formic and acetic acid the usable strains can be ATCC 26013 and/or 14462: in all other cases it is necessary to use the described strains individually.

DESCRIPTION OF THE PREFERRED EMBODIMENTS

In a preferred embodiment of the invention, the odhomeofermenting process is used to obtain lactic acid. It is evident that by changing in an obvious manner some operating methods and by appropriately using the strains listed above it is possible to achieve separation of the other catabolites derived from pyruvic acid. These separation methods can be physical (centrifugation, osmotic filtration, etcetera) or chemical by means of reagents which are specific for the catabolites involved.

Figure 4:
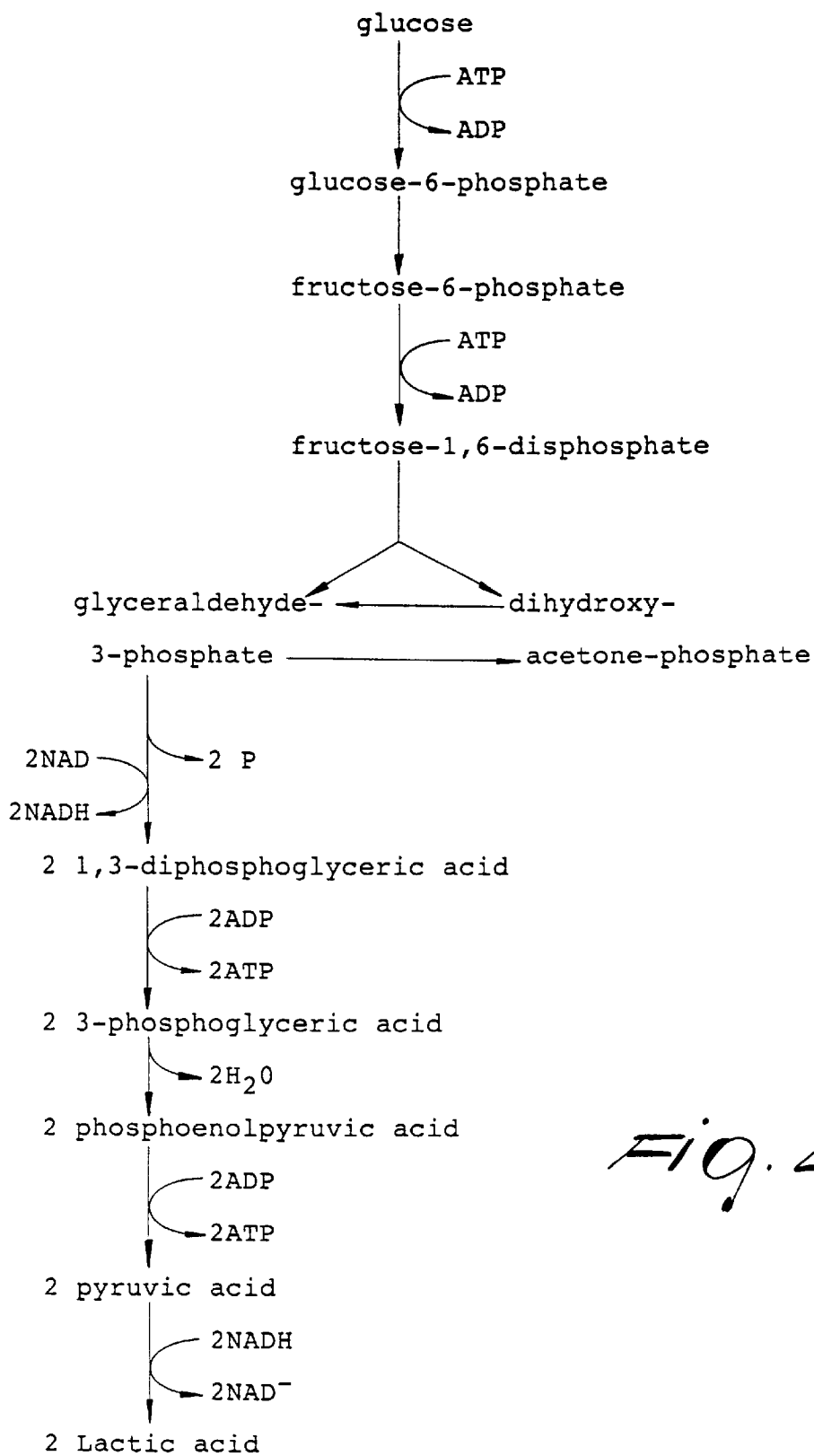

The biochemical route provided in the process aimed at obtaining lactic acid is shown in FIG. 4 as diagram 3.

When a microorganism which produces lactic acid is actually used, it should be noted that said lactic acid must then be removed to prevent it from modifying the pH to the point of halting metabolization. This drawback is obviated by adding milk of lime under automatic pH control. The resulting calcium lactate is perfectly water-soluble and causes no alteration to the fermentative metabolism.

The resulting biomass and the calcium lactate are sent to a digester 16 which separates the biomass from the lactate by solid/liquid centrifugation 17. As in the case of the centrifugation stage 9, the solid fraction is constituted by milk proteins, which are also conveyed toward the drier 10 and dried with a "paddle-drier" method and packaged for sale with possible applications in the food sector as well.

Optionally, the supernatant produced by centrifugation is instead routed to the reactor 18. Since the supernatant contains calcium lactate, it is recovered by acidification with $H_2SO_4$ in 18 until pH 4 is reached and is then subjected, in 19, to solid/solid centrifugation of the calcium sulfate obtained in the preceding step. The lactic acid thus separated by centrifugation is concentrated to 80% in vacuum and stored for sale: the calcium sulfate can be a secondary raw material for several uses, for example as a correcting agent for silty compact soils which are poor in calcium. The supernatant is thus purified by means of an aeroaccelerator, as described in another patent application in the name of the same Applicant.

The disclosures in Italian Patent Application No. MI98A000389 from which this application claims priority are incorporated herein by reference.

What is claimed is:

1. A method for the metabolization of lactose contained in whey or whey fractions comprising contacting the whey or whey fractions with two symbiotic Hyphomycetes to achieve both an enzymatic breakdown of the lactose into the saccharides glucose and galactose and metabolization of said galactose into a glucose-derivative, wherein said symbiotic microorganisms are a glucose+galactose− Hyphomycete and a glucose−galactose+ Hyphomycete.

2. The method of claim 1, wherein said symbiotic Hyphomycetes are *Kluyveromices Marxianus* ATCC Code 8554 and ATCC Code 8601.

3. A method for the metabolization of lactose contained in whey or whey fractions comprising the steps of:
   a) contacting pasteurised whey or whey fractions with a ion-exchange resin to provide a partial demineralisation;
   b) homogenising the whey or whey fractions of step a) with a substantially equivalent amount of pasteurised whey or whey fractions to provide a whey based product containing lactose;
   c) adding to the whey based product a medium comprising a glucose+galactose− Hyphomycete and a glucose−galactose+ Hyphomycete which performs both enzymatic breakdown of lactose into the saccharides glucose and galactose and metabolization of said galactose into a glucose derivative thus achieving a lactose-free liquid containing breakdown sugars;
   d) seeding said liquid with *Kluyveromyces Marxianus*, ATCC Code 36907 to perform further metabolization of sugars and obtaining a protein-rich biomass;
   e) centrifugating said biomass to separate a liquid and a solid protein-rich fraction;
   f) drying the solid fraction to obtain a protein-based product.

4. The method of claim 3, wherein said symbiotic microorganisms are *Kluyveromices Marxianus* ATCC Code 8554 and ATCC Code 8601.

5. The method of claim 3, wherein the medium of step c) further comprises *Yarrowia Lypolytica* ATCC Code 8661 and ATCC Code 8662 to increase the yield of enzymatic breakdown of the lactose.

6. The method of claim 3, wherein the liquid resulting from step c) is balanced in its nutritional factors to obtain a ratio C:N:P=10:5:1.

7. The method of claim 6, wherein ammonium sulfate, ammonium nitrate, biotin, folic acid, pyridoxine HCl, Thiamine HCl, Riboflavin, Nicotinic acid, calcium pantothenate, cyanocobalamine, p-aminobenzoic acid, thioctic acid are added to said liquid to balance the nutritional factors.

8. The method of claim 3, wherein the liquid fraction of step d) is further seeded with an ethanol+ Hyphomycete to provide an ethanol-free biomass which is then centrifuged to provide a humus based product.

9. The method of claim 8, wherein said ethanol+ hyphomycete is *Candida utilis* ATCC Code 26387.

10. A method for the metabolization of lactose contained in whey or whey fractions comprising the steps of:
   a) contacting pasteurised whey or whey fractions with a ion-exchange resin to provide a partial demineralisation;
   b) homogenising the whey or whey fractions of step a) with a substantially equivalent amount of pasteurised whey or whey fractions to provide a whey-based product containing lactose;
   c) adding the whey-based product with a medium comprising a glucose+galactose− Hyphomycete and a glucose−galactose+ Hyphomycete which performs both enzymatic breakdown of lactose into the saccharides glucose and galactose and metabolization of said galactose into a glucose derivative thus achieving a lactose-free liquid containing breakdown sugars;
   d) seeding said lactose-free liquid with a biomass containing a homeofermenting microorganism to perform fermentation of glucose and glucose derivatives.

11. The method of claim 10, wherein said homeofermenting microorganism is selected from the group consisting of *Lactobacillus Pentosus* ATCC Code 8041, *Sporolactobacillus Inulinus* ATCC Code 15538, *Polyporus Palustris* ATCC Code 26013, *Zygosaccharomices Rouxii* ATCC Code 14462, *Klebsiella Oxytoca* ATCC Code 8724, *Acetobacter Pasterianus* ATCC Code 12879, *Saccharomyces Cerevisiae* ATCC Code 13668, *Clostridium Acetobutylicum* ATCC Code 39236, *Clostridium Populeti* ATCC Code ATCC35295, *Clostridium Acetobutylicum* ATCC Code 824, *Saccharomices sp.* ATCC Code 20017, *Pseudomonas Putida* biotype ATCC Code 21244.

12. The method of claim 10, wherein the fermentation of step d) is a homolactic fermentation.

13. The method of claim 10, wherein the fermentation of step d) is an alcoholic fermentation.

14. A method for the metabolization of lactose contained in whey or whey fractions comprising the steps of:
   a) contacting pasteurised whey or whey fractions with a ion-exchange resin to provide a partial demineralisation;
   b) homogenising the whey or whey fractions of step a) with a substantially equivalent amount of pasteurised whey or whey fractions to provide a whey-based product containing lactose;
   c) adding the whey-based product with a medium comprising a glucose+galactose− Hyphomycete and a glucose−galactose+ Hyphomycete which performs both enzymatic breakdown of lactose into the saccharides glucose and galactose and metabolization of said galactose in a glucose derivative thus achieving a lactose-free liquid containing breakdown sugars;
   d) adding to said lactose-free liquid a biomass containing a homeofermenting microorganism which produces lactic acid to perform fermentation of glucose and glucose derivatives into lactic acid,
   e) adding milk of lime to said biomass to precipitate lactic acid into calcium lactate;
   g) separating by centrifugation the solid fraction containing milk protein by the liquid fraction containing the calcium lactate;
   h) drying said solid fraction.

15. The method of claim 14, further comprising the addition of sulfuric acid to the liquid fraction containing calcium lactate which results in the precipitation of calcium sulfate and the separation and recovery of the liquid fraction containing lactic acid by the calcium sulfate.

* * * * *